United States Patent [19]
Kuthyar et al.

[11] Patent Number: 5,768,513
[45] Date of Patent: Jun. 16, 1998

[54] MULTIMEDIA MESSAGING USING THE INTERNET

[75] Inventors: Ashok K. Kuthyar, Holmdel; Robert Edward Markowitz, Glen Rock; Steven Howard Nurenberg, Manalapan, all of N.J.; Joseph Thomas O'Neil, Staten Island, N.Y.; Carlos Alberto Perea, Bethlehem, Pa.; Kenneth H. Rosen, Middletown, N.J.

[73] Assignee: AT&T Corp., Middletown, N.J.

[21] Appl. No.: 671,227

[22] Filed: Jun. 27, 1996

[51] Int. Cl.[6] .................................................. G06F 17/00
[52] U.S. Cl. ............................................... 395/200.34
[58] Field of Search ................... 395/200.34, 200.35, 395/200.36, 200.79, 200.8; 379/201, 207, 230; 370/30, 112; 345/330, 331

[56] References Cited

U.S. PATENT DOCUMENTS

| | | | |
|---|---|---|---|
| 5,315,633 | 5/1994 | Champa | 348/16 |
| 5,473,363 | 12/1995 | Ng et al. | 348/15 |
| 5,608,786 | 3/1997 | Gordon | 379/201 |
| 5,617,539 | 4/1997 | Ludwig et al. | 395/200.35 |
| 5,659,692 | 8/1997 | Paggio et al. | 345/330 |

*Primary Examiner*—Ellis B. Ramirez
*Attorney, Agent, or Firm*—Stephen M. Gurey

[57] ABSTRACT

A communications system uses a World Wide Web (Web) server to provide multimedia messaging functions over the Internet. Multimedia workstations are interconnected via the public switched telephone network (PSTN). Parties are provided with multimedia mailboxes on message servers that are connected to the PSTN and the Internet. In order to identify the message server on which a called party's mailbox is located, the Web server provides the multimedia number of the called party's message server when a call is made. In addition, the Web server provides the multimedia number of the called party. When a multimedia call is unanswered, the system uses the multimedia number of the message server and the called party multimedia number provided by the Web server to record and store a message for the called party in the called party's mailbox.

22 Claims, 4 Drawing Sheets

# MULTIMEDIA MESSAGING USING THE INTERNET

FIELD OF THE INVENTION

This invention relates to multimedia communications, and more particularly, to multimedia messaging systems.

BACKGROUND OF THE INVENTION

Multimedia conferencing allows parties to meet face-to-face without traveling. Presently available multimedia conferencing workstations are suitable for desk top use and support simultaneous video, audio, and data. Multimedia calls can be placed using Integrated Services Digital Network (ISDN) lines in the public switched telephone network by calling a party's multimedia number. If the called party answers, the call can be completed immediately. If the called party's line is busy or if the called party is absent or unable to answer the call, a multimedia messaging system is needed to answer the call.

To ensure that multimedia calls are answered even when the called party's multimedia workstation is off or otherwise not available to receive messages, multimedia messaging functions can be provided by a network-based service provider, rather than by the called party's own workstation. A network-based multimedia messaging system is described in commonly-assigned copending U.S. patent application Ser. No. 08/357,473, filed Dec. 16, 1994 ("the '473 application"), which is hereby incorporated by reference herein. As described in the '473 application, if the public switched telephone network is provided with the appropriate switching capabilities, the network can redirect unanswered multimedia calls to a user's multimedia mailbox on a special messaging server.

The call answering functions of the '473 application are based on the capabilities of a class of network switch known as the 5ESS™ (electronic switching system) switch implemented at the generic 6 level or above. When a calling party attempts to reach a called party who is unavailable, the 5ESS™ switch at the called party's local exchange carrier (LEC) network redirects the call to the special messaging server. In order for the messaging server to play the greeting for the correct called party and to record and store the calling party's message in the appropriate mailbox location, the 5ESS™ switch provides called party identification (ID) information (sometimes called automatic number identification or ANI) to the messaging server. However, if the messaging server is located in a different local or interexchange carrier network, a portion of the called party ID information supplied by the 5ESS™ switch might be omitted or might not be provided in the appropriate data field. As a result, the messaging server would not be able to identify the intended recipient of the message. Although the messaging system of the '473 application is satisfactory, it would be desirable to be able to provide a messaging system that is less dependent on the extent to which 5ESS™ switches are deployed in the network.

It is therefore an object of the present invention to provide a communications system with improved multimedia messaging service capabilities.

SUMMARY OF THE INVENTION

This and other objects of the invention are accomplished in accordance with the principles of the present invention by providing a communications system in which a World Wide Web (Web) server is used to perform multimedia messaging functions. The Web server provides a user interface by supplying Web pages to multimedia workstations over the Internet. The Web pages include a variety of multimedia calling and messaging options. For example, a party at a workstation can select a party to be called from directory information displayed on the workstation.

Multimedia workstations are interconnected by a multimedia bridge system and the public switched telephone network (PSTN). Parties are provided with multimedia mailboxes on message servers that are connected to the PSTN and the Internet. In order to identify the message server on which the called party's mailbox is located when a call is unanswered, the Web server provides the multimedia number of the called party's message server to the multimedia bridge system when a call is made. In addition, the Web server provides the multimedia number of the called party. The called party multimedia number from the Web server is used to identify the proper mailbox in which to store a message for the called party. To record a message, the multimedia bridge system establishes a multimedia connection between the calling party and the called party's mailbox on the appropriate message server. Because the call is rerouted by the multimedia bridge system rather than by specialized switches within the PSTN, the system allows multimedia calls to be answered even if the message server of the called party is located across a local or interexchange network.

Additional multimedia messaging features, such as message or greeting playback, greeting recording, and various mailbox management functions are also provided by the system. These features are invoked through the user interface provided by the Web pages displayed at the user's workstation. Parties are given access to multimedia mailboxes without being required to know on which message server a particular mailbox is located.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
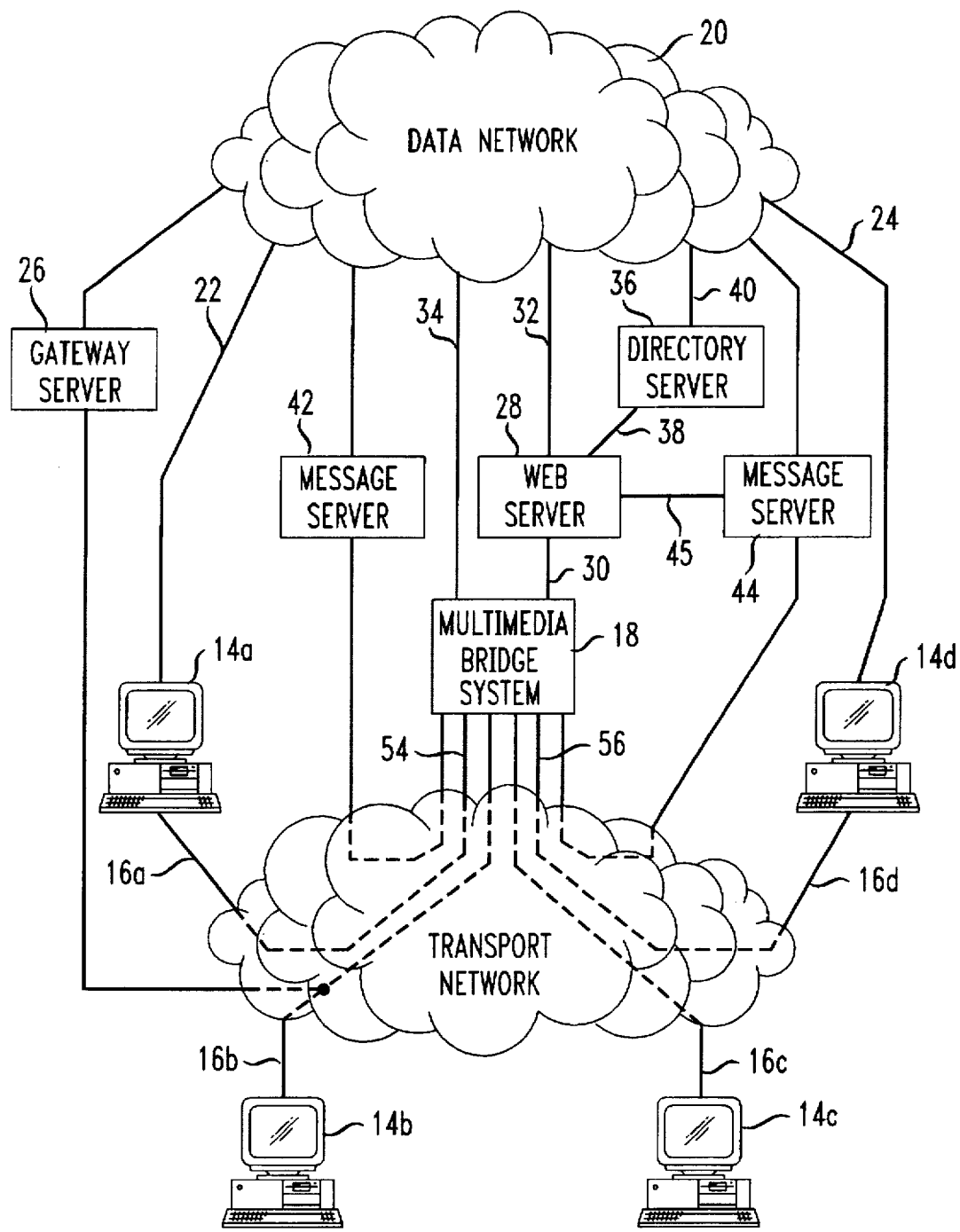
FIG. 1 is a diagram of a communications system that supports multimedia messaging in accordance with the principles of the present invention.

As shown in FIG. 1, in communications system 10, transport network 12 interconnects multimedia workstations 14. Parties at workstations 14 can originate or receive multimedia calls having video, audio, and data components. Transport network 12 is preferably the public switched telephone network (PSTN). Workstations 14 are connected to transport network 12 via lines 16, which may be any suitable communication paths for supporting realtime multimedia communications. Preferably, lines 16 and the associated paths within transport network 12 are Integrated Services Digital Network (ISDN) lines.

A party at one of workstations 14 (e.g., workstation 14a) can place a multimedia call to a party at another of workstations 14 (e.g., workstation 14d) directly though transport network 12 using the multimedia number (a 10 digit number analogous to a standard telephone number) of the party to be called. Alternatively, multimedia bridge system 18 can be used with transport network 12 to interconnect workstations 14. Using multimedia bridge system 18 allows conference calls to be established between multiple parties.

Workstations 14a and 14d are connected to data network 20, which is preferably the Internet, via lines 22 and 24, respectively. Lines 22 and 24 are typically plain old telephone service (POTS) lines or the lines of a private data network. If desired, lines 22 and 24 may be ISDN lines. Workstation 14b is connected to data network 20 via line 16b, transport network 12, and gateway server 26, which avoids the need for workstation 14b to have a second communication line, such as line 22 or 24. The use of a gateway server to provide a connection to a data network is described in commonly-assigned copending U.S. patent application Ser. No. 08/547,216, filed Oct. 24, 1995, which is hereby incorporated by reference herein. Standard multimedia workstation 14c is connected to transport network 12, but not data network 20 to illustrate that parties at workstations 14a, 14b, and 14d can communicate with a standard multimedia workstation, if desired.

Workstations 14a, 14b and 14d are connected to World Wide Web (Web) server 28 via data network 20. Preferably, data network 20 is the Internet. Directory information, such as the multimedia numbers of various parties can be provided to workstations 14a, 14b, and 14d in the form of Web pages, as described in commonly-assigned copending U.S. patent application Ser. No. 08/671,223 (Attorney Docket No. Bruno 11-13-1-1-3), filed Jun. 27, 1996, which is hereby incorporated by reference herein. In addition, Web server 28 provides a user interface that allows the parties to record multimedia greetings, record and send messages, and perform other multimedia mailbox functions.

A party at workstation 14a, 14b, or 14d can select a party to be called from directory information displayed at that workstation as Web pages from Web server 28. When a party is selected, directory information including information identifying the called party's message server and multimedia mailbox is provided to multimedia bridge system 18, which establishes a multimedia connection between the workstation 14 of the calling party and the workstation 14 of the called party via transport network 12. The directory information is provided to multimedia bridge system 18 by Web server 28 directly via line 30 or via data network 20 using lines 32 and 34. The directory information may be stored on directory server 36, which is accessed by Web server 28 directly via line 38 or via data network 20 using lines 32 and 40. If desired, directory server 36 may be co-located with Web server 28.

Message servers 42 and 44 are used to play multimedia greetings and to record multimedia messages when the multimedia number of the called party is not answered. Message servers can be connected directly to Web server 28 or can be connected to Web server 28 via data network 20. For example, message server 44 is directly connected to Web server 28 via line 45 and message server 42 is connected to Web server 28 via data network 20. An advantage of the arrangement of communications system 10 is that if the storage capacity of one message server is reached, additional greetings and messages may be stored at another message server. Parties interact with message servers 42 and 44 via the user interface provided by Web server 28, so parties are not required to know which particular message server is being used.

Figure 2:
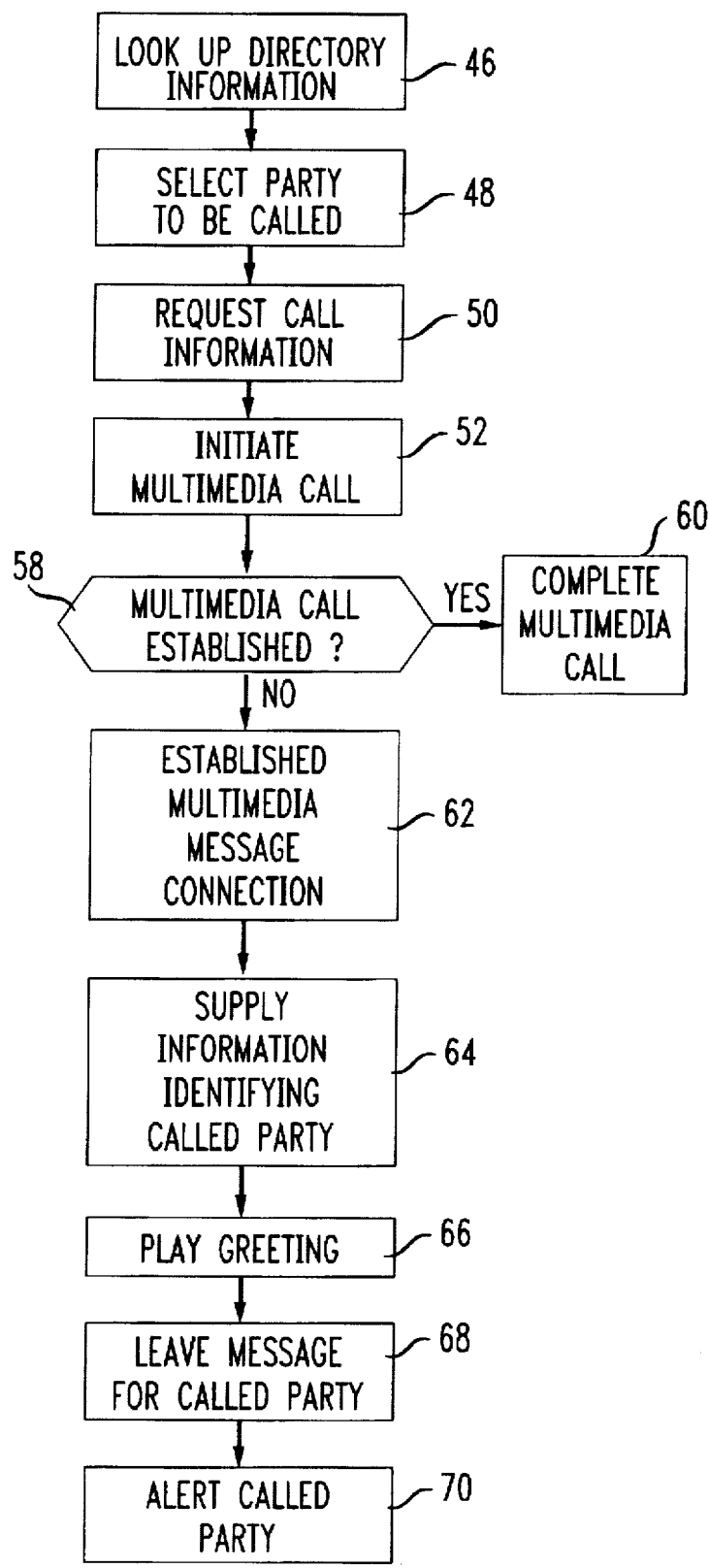
FIG. 2 is a flow chart showing steps involved in call answering using the communications system of FIG. 1.

FIG. 2 shows steps involved in recording an unanswered multimedia call. At step 46, the calling party retrieves Web pages containing multimedia directory information from Web server 28. The directory information preferably contains the names of various parties with multimedia workstations and their corresponding multimedia numbers. In order to provide multimedia message answering, the directory information includes the multimedia number of the message server on which the called party's multimedia messages are to be stored. For example, if the called party has a multimedia mailbox on message server 42 (FIG. 1), then the multimedia number by which an ISDN link can be established to message server 42 (FIG. 1) via transport network 12 (FIG. 1) is included with the other directory information for the called party. If desired, the directory information may contain home and business addresses, fax, e-mail, and telephone numbers, and images of the parties.

At step 48, the calling party selects the party to be called from the displayed directory information. A request to initiate the multimedia call based on the directory information for the selected party is provided to multimedia bridge 18 by the calling party's workstation at step 50. The request preferably contains the calling party's multimedia number, the called party's multimedia number, and the multimedia number of the message server on which the called party's mailbox is located. At step 52, multimedia bridge system 18 initiates a multimedia call between the calling party (at, e.g., workstation 14a) and the called party (at, e.g., workstation 14d) by establishing a communication path to workstation 14a using ISDN line 54 (FIG. 1) and by establishing a communication path to workstation 14d via ISDN line 56 (FIG. 1).

If a multimedia call is established at step 58, the call is completed at step 60. If, however, multimedia bridge system 18 determines that a multimedia call connection has not been established at step 58, because the line is busy or the called party has not answered within a predetermined time period, a multimedia message connection with the called party's message server is established at step 62. The multimedia bridge 18 establishes the multimedia message connection at step 62 using the multimedia number for the called party's message server (e.g., message server 42) that was provided when setting up the multimedia call at steps 46, 48, 50, and 52.

In order for message server 42 to play the appropriate greeting and to store the incoming multimedia call in the correct multimedia mailbox, mailbox functions in message server 42 are preferably organized by the multimedia numbers of the parties. After a multimedia connection is established between, for example, workstation 14a and message server 42, multimedia bridge system 18 provides message server 42 with the multimedia number or other suitable addressing information for the called party at step 64. At step 66, message server 42 plays the prerecorded multimedia greeting associated with the called party's multimedia number. The calling party leaves a multimedia message for the called party on message server 42 at step 68. The message is stored in the mailbox associated with the called party's multimedia number.

The called party is preferably alerted that a multimedia message has been received at step 70. Any suitable technique for alerting the called party may be used. For example, message server 42 can call the called party's telephone voice mail system and leave a voice mail message. Message server 42 could also activate an alerting signal indicator on workstation 14d. If desired, an e-mail or fax message could be sent. An alerting message can also be sent to the called party via Web server 28.

Figure 3:
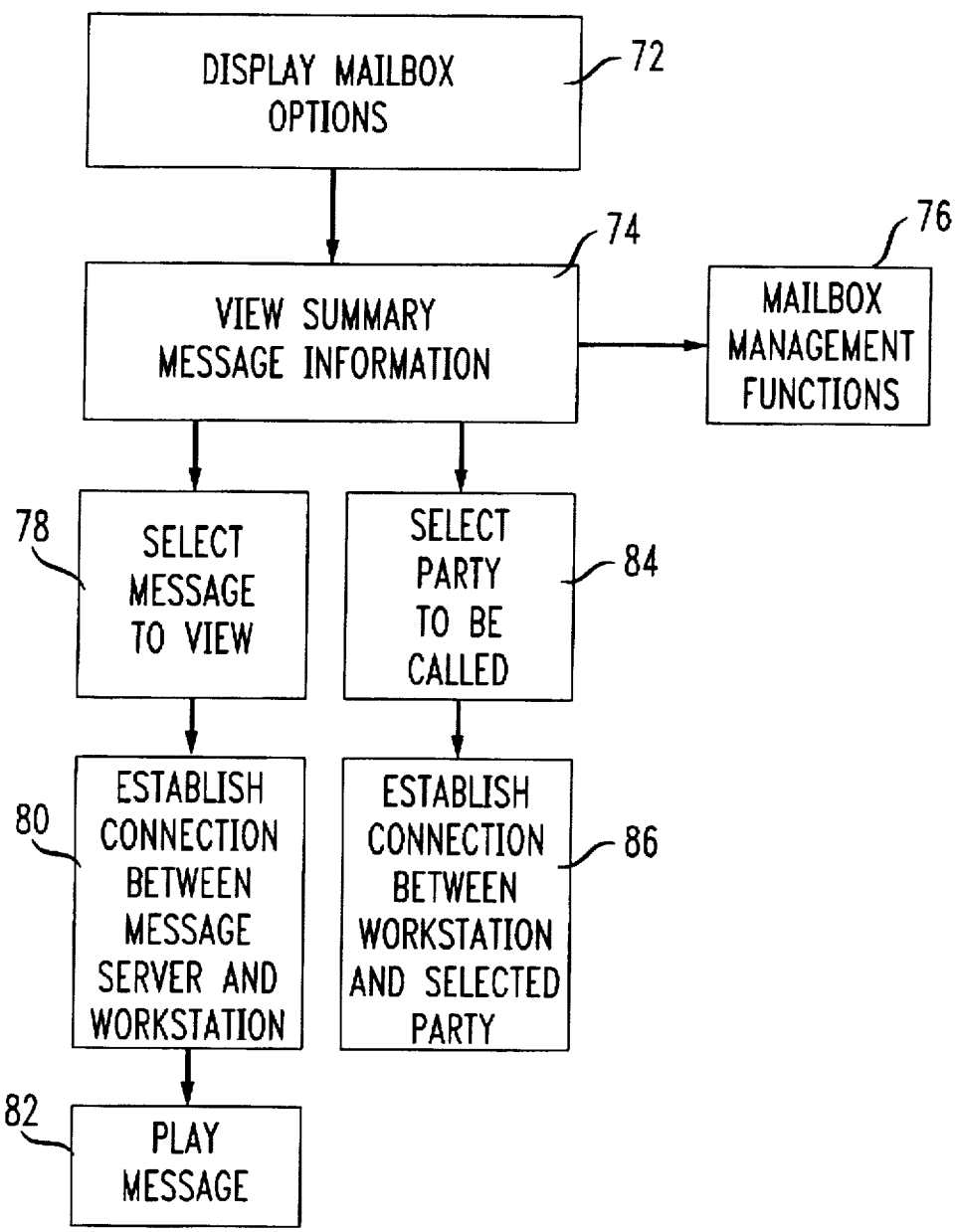
FIG. 3 is a flow chart showing steps involved in multimedia message playback using the communications system of FIG. 1.

Whenever a party wishes to accesses his mailbox, such as after being alerted that his mailbox contains a multimedia message, the user retrieves Web pages from Web server 28 that provide a list of mailbox options, such as "send a message" or "record a greeting." As shown in FIG. 3, after displaying the mailbox options at step 72, the party can view summary information for the messages stored in the mailbox at step 74. The summary message information preferably includes the length of the message, the time that the message was received, and the name and multimedia number of the calling party. Other directory information associated with the calling party can be provided, if desired.

Certain mailbox management functions are preferably available while the summary message information is being displayed at step 74. For example, at step 76, message mailbox management functions such as deleting, archiving, annotating, or forwarding multimedia messages can be performed.

If the party desires to view one of the messages listed in the message summary, the message to be viewed is selected at step 78. The party's workstation (e.g., workstation 14d) generates a message playback request. The message may be played back using two approaches.

The first approach involves using Web server 28 to provide the playback request to multimedia bridge system 18 and message server 42. At step 80, multimedia bridge system 18 establishes a multimedia connection between the message server containing the user's mailbox (message server 42) and the user's workstation 14d. The message can then be played back by message server 42 over this connection at step 82.

The second approach involves establishing a direct communication link between message server 42 and workstation 14d. The playback request from workstation 14d can contain service request commands that direct message server 42 to establish a direct communication link with workstation 14d via transport network 12 at step 80. The service commands are supplied over data network 20. The message is played back over a direct ISDN connection through transport network 12 at step 82. Commonly-assigned copending U.S. patent application Ser. No. 08/402,664, filed Mar. 13, 1995, which is hereby incorporated by reference herein, describes how a first server (like workstation 14d) can use service requests transmitted over the Internet to establish a communication link with a second server (like message server 42) over the PSTN.

If desired, after a party views the summary message information at step 74, the party can return a call at step 84 by selecting a party to be called directly from the listed summary information. Workstation 14d generates a request to initiate a multimedia call, which is preferably provided to multimedia bridge system 18 via Web server 28. At step 86, multimedia bridge system 18 establishes a multimedia call between the party at workstation 14d and the party that was selected from the summary information at step 84.

Figure 4:
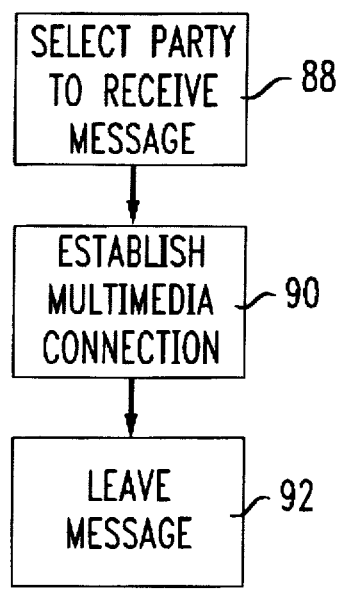
FIG. 4 is a flow chart showing steps involved in sending a multimedia message using the communications system of FIG. 1.

A party may sometimes wish to leave a multimedia message for a given recipient without first attempting to place a multimedia call. Steps involved in recording and sending a multimedia message are shown in FIG. 4. At step 88, the party sending the message selects a party to receive the multimedia message. Preferably, the sender selects the intended recipient from a list of directory information supplied by Web server 28 to the sender's workstation 14 (e.g., workstation 14a) in the form of Web pages. Two approaches may be used to record the message for the recipient. The first approach involves using Web server 28 to provide a request to multimedia bridge system 18 to establish a multimedia connection between workstation 14a and message server 42. At step 80, multimedia bridge system 18 establishes a multimedia connection between message server 42 and workstation 14a. Message server 42 is provided with the multimedia number of the intended recipient, so that message server 42 can store the message in the proper mailbox. At step 92, the sender leaves the message for the recipient over the connection that was established at step 90. The second approach involves establishing a direct communication link between message server 42 and workstation 14a at step 90 using service requests from workstation 14a supplied over data network 20, as described in above-mentioned U.S. patent application Ser. No. 08/402,664. Message server 42 is provided with the multimedia number of the intended recipient at step 90, so that the message can be stored in the proper mailbox on message server 42 when the message is left by the sender at step 92.

Figure 5:
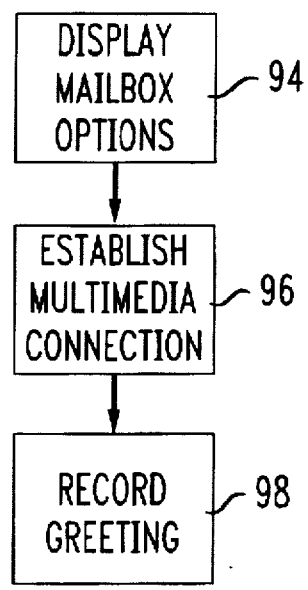
FIG. 5 is a flow chart showing steps involved in recording a greeting using the communications system of FIG. 1.

Steps involved in recording a greeting are shown in FIG. 5. At step 94, a party desiring to record a greeting directs his workstation 14 (e.g., workstation 14a) to display his mailbox options in the form of Web pages from Web server 28. When the party selects the option of "record a greeting." a multimedia connection is established between workstation 14a and the message server containing his mailbox (e.g., message server 42). When initiating the connection, workstation 14a supplies the multimedia number of the party or other suitable identification information, so that message server 42 can associate the recorded greeting with the appropriate mailbox. Two approaches may be used to establish the multimedia connection between message server 42 and workstation 14a. The first approach involves using Web server 28 to provide a request to multimedia bridge system 18 to establish a multimedia connection between workstation 14a and message server 42. At step 96, multimedia bridge system 18 establishes a multimedia connection between message server 42 and workstation 14a. Because message server 42 is provided with the multimedia number of the party, message server 42 records the new greeting in the proper mailbox at step 98 over the connection that was established at step 96. The second approach involves establishing a direct communication link between message server 42 and workstation 14a at step 96 using service requests from workstation 14a supplied over data network 20, as described in the above-mentioned U.S. patent application Ser. No. 08/402,664. Because message server 42 has the multimedia number of the party, the greeting can be recorded in the proper mailbox on message server 42 at step 98.

The foregoing is merely illustrative of the principles of this invention and various modifications can be made by those skilled in the art without departing from the scope and spirit of the invention.

What is claimed is:

1. A method for providing multimedia messaging in a communications system in which a calling party at one multimedia workstation places multimedia calls to a called party at another multimedia workstation over a transport network, the communications system having a data network server connected to the calling party workstation and the called party workstation through a data network and a plurality of message servers connected to the transport network each containing multimedia mailboxes, the called party having a mailbox on one of the message servers, the method comprising the steps of:

provaling message server identifying information with the data network server that identifies which of the message servers contains the mailbox of the called party;

establishing a multimedia connection between the calling party workstation and the message server identified by the message server identifying information when a call placed by the calling party to the called party is unanswered by the called party;

providing called party identifying information from the data network server to the message server identified by the message server identifying information; and recording a message in the mailbox of the called party over the established multimedia connection using the called party identifying information.

2. The method defined in claim 1 wherein:

the data network server is a Web server; and the data network is the Internet.

3. The method defined in claim 1 wherein the step of providing message server identifying information comprises the step of providing the multimedia number for the message server that contains the mailbox of the called party.

4. The method defined in claim 1 wherein the step of establishing the multimedia connection comprises the step of establishing a multimedia connection between the calling party and the message server identified by the message server identifying information with a multimedia bridge system using the multimedia number of the calling party workstation and the multimedia number of the message server.

5. The method defined in claim 1 wherein the step of providing the called party identifying information comprises the step of supplying the multimedia number of the called party workstation to the message server identified by the message server identifying information.

6. The method defined in claim 1 further comprising the step of providing the multimedia numbers of: (1) the calling party workstation, (2) the called party workstation, and (3) the message server containing the mailbox of the called party with the data network server when placing a call from the calling party workstation to the called party workstation.

7. The method defined in claim 1 further comprising the step of providing mailbox options in the form of Web pages from the data server for displaying at the calling party workstation.

8. The method defined in claim 1 further comprising the step of providing summary message information for viewing with said called party workstation.

9. The method defined in claim 1 further comprising the steps of:

providing a list of parties with the data network server that is displayed on the calling party workstation and from which a recipient to receive a message is selected;

establishing a multimedia connection between the calling party workstation and the message server containing the mailbox of the selected recipient; and recording a multimedia message for the recipient in the mailbox of the recipient using the established multimedia connection.

10. The method of claim 1 further comprising the steps of:

using the data network server to provide a list of the messages that are stored in the mailbox of the called party and from which a message to view on the called party workstation is selected; and establishing a multimedia connection between the called party workstation and the message server containing the mailbox in which the listed messages are stored for playing back the selected message on the called party workstation.

11. A communications system for providing multimedia messaging in which a calling party at one multimedia workstation places multimedia calls to a called party at another multimedia workstation over a transport network, the multimedia workstations being connected to a data network, the system comprising:

a plurality of message servers connected to the transport network and to the data network, the message servers containing a plurality of mailboxes and the called party having a mailbox on one of the message servers; and a data network server connected to the multimedia workstations through the data network, the data network server supplying called party identifying information and message server identifying information that identifies which of the message servers contains the mailbox for the called party, wherein when a call placed by the calling party to the called party is unanswered by the called party:

a multimedia connection is established between the calling party workstation and the message server identified by the message server identifying information;

the called party identifying information from the data network server is provided to the message server identified by the message server identifying information; and a message is recorded in the mailbox of the called party over the established multimedia connection using the called party information.

12. The system defined in claim 11 wherein:

the data network server is a Web server; and the data network is the Internet.

13. The system defined in claim 11 wherein the message server identifying information is the multimedia number for the message server that contains the mailbox of the called party.

14. The system defined in claim 11 further comprising a multimedia bridge system for establishing the multimedia connection between the calling party and the message server identified by the message server identifying information using the multimedia number of the calling party workstation and the multimedia number of the message server.

15. The system defined in claim 11 wherein the called party identifying information is the multimedia number of the called party workstation.

16. The system defined in claim 11 wherein, when placing a call from the calling party workstation to the called party workstation, the data network server provides the multimedia numbers of: (1) the calling party workstation, (2) the called party workstation, and (3) the message server containing the mailbox of the called party.

17. The system defined in claim 11 wherein the data network server supplies mailbox options to the calling party workstation in the form of Web pages.

18. The system defined in claim 11 wherein the data network server supplies summary message information for viewing with the called party workstation.

19. The system defined in claim 11 wherein:

the data network server provides a list of parties for displaying on the calling party workstation from which a recipient to receive a message is selected;

a multimedia connection is established between the calling party workstation and the message server containing the mailbox of the recipient; and a multimedia message is left for the recipient in the mailbox of the recipient.

20. The system defined in claim 19 wherein:

the data network server provides a list of messages stored in the mailbox of the called party that are displayed on the called party workstation and from which a message to view is selected; and a multimedia connection is established between the called party workstation and the message server containing the mailbox in which the listed messages are stored for playing back the selected message on the called party workstation.

21. A method for using a communications system to send multimedia messages from a sending party multimedia workstation to a recipient over a transport network, the communications system having a data network server connected to the sending party workstation through a data network and a plurality of message servers connected to the transport network each containing multimedia mailboxes, the recipient having a mailbox on one of the message servers, the method comprising the steps of:

providing a list of parties with the data network server that is displayed on the sending party multimedia workstation and from which the recipient to receive the message is selected;

establishing a multimedia connection between the sending party multimedia workstation and the message server containing the mailbox of the selected recipient; and recording a multimedia message for the recipient in the mailbox of the recipient using the established multimedia connection.

22. A communications system for sending multimedia messages from a sending multimedia party workstation to a recipient over a transport network, the sending party multimedia workstation being connected to a data network, the system comprising:

a data network server connected to the sending party multimedia workstation through the data network for providing a list of parties to display on the sending party multimedia workstation and from which a recipient to receive a message is selected; and a plurality of message servers connected to the transport network and to the data network, the message servers containing a plurality of mailboxes and the selected recipient having a mailbox on one of the message servers, wherein:

a multimedia connection is established between the sending party workstation and the message server containing the mailbox of the recipient; and a multimedia message is left for the recipient in the mailbox of the recipient using the established connection.

* * * * *